May 13, 1941. K. RABE 2,241,826
AUXILIARY SPRING MEANS FOR VEHICLES
Filed June 22, 1938 2 Sheets-Sheet 1
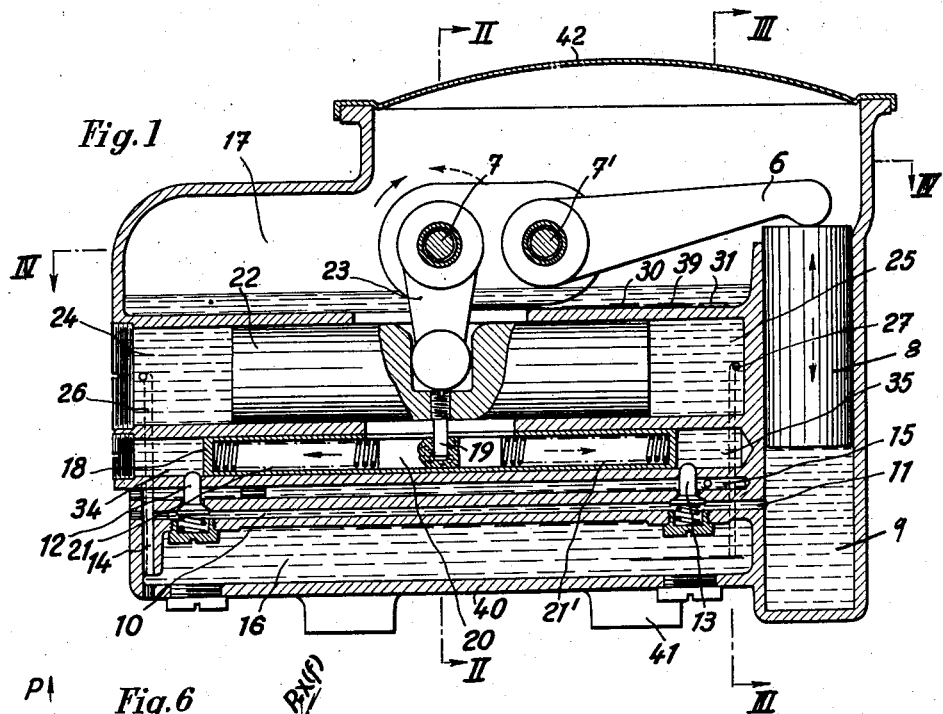
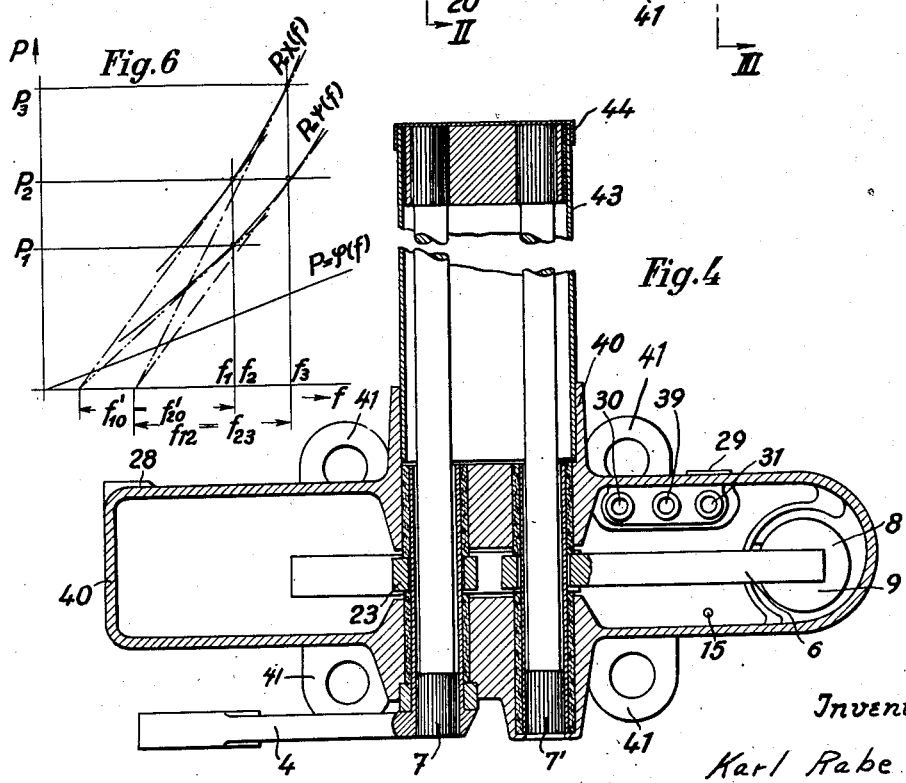
Inventor:
Karl Rabe
by
Attorneys May 13, 1941.  K. RABE  2,241,826
AUXILIARY SPRING MEANS FOR VEHICLES
Filed June 22, 1938  2 Sheets-Sheet 2
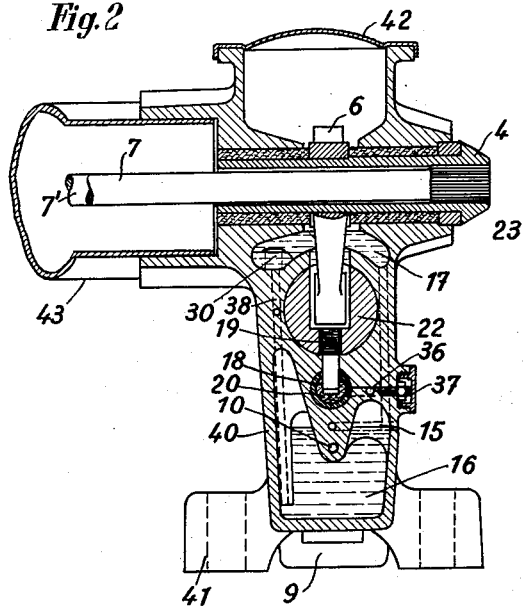
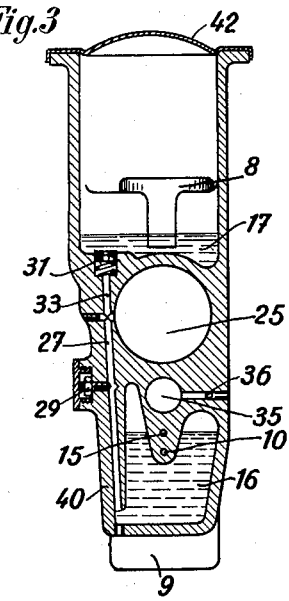
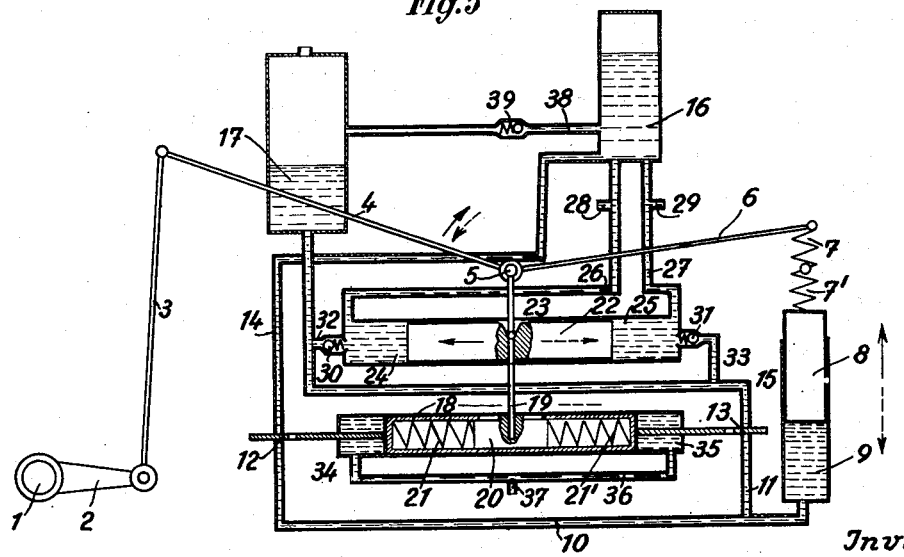
Inventor:
Karl Rabe Patented May 13, 1941

2,241,826

UNITED STATES PATENT OFFICE 2,241,826

AUXILIARY SPRING MEANS FOR VEHICLES

Karl Rabe, Stuttgart, Germany, assignor to Dr. ing. h. c. F. Porsche, K.-G., Stuttgart-Zuffenhausen, Germany, a company of Germany Application June 22, 1938, Serial No. 215,118
In Germany July 21, 1937

25 Claims. (Cl. 267—57)

The present invention pertains to auxiliary spring means for vehicles, particularly vehicles subjected to great variations in loading and it is an object to provide such means in which the restoration of the sprung parts to their middle position is effected automatically. The subjects matter of the instant invention is similar to that disclosed in my co-pending application Serial No. 748,051, filed October 12, 1934, now United States Patent 2,161,431, issued June 6th, 1939, but differs therefrom in details of construction and application, as will be immediately apparent from a comparison between the two.

A feature of the invention consists therein that a resetting means operates upon the sprung parts through an auxiliary spring whereby these parts are always restored to their middle position so that the main spring means are available for springing in either direction and over a wide range. It is another object of the invention to arrange the auxiliary spring to work progressively upon the sprung parts so that when combined with the main spring means the resulting springing is itself progressive, viz., that the reaction upon the occurrence of hard shocks and high loading is considerably harder than in the case of light shocks and smaller loading. This progressive springing may furthermore in accordance with the invention be accomplished by using either an auxiliary spring with progressive characteristics as for example, a rubber spring or a spring with straight line characteristics, as for example a torsion bar or a leaf spring, the connection of which, however, with the sprung parts occurs over levers and links in such a manner that increased loading produces a shortening of the lever arm effective upon the auxiliary spring. As the operating medium for the resetting means, a fluid is to be used which is to be supplied to and removed from the resetting mechanism in accordance with the loading. As operating medium, certain oils and mixtures thereof are mainly employed. They must not corrode the materials of the auxiliary mechanism or the auxiliary spring, must have good lubricating qualities, and their chemical and physical characteristics must remain practically unchanged by time and change in temperature. In accordance with the invention a piston shock absorber is preferably coupled with the restoring mechanism, which shock absorber is preferably double acting and serves preferably as the driving medium for the resetting mechanism. If, furthermore, in accordance with the invention, the pump space of the shock absorber is connected on one side with a pressure container through a conduit provided with a throttle and on the other side with the fluid supply container through a conduit provided with a check valve, a simple means is provided for providing fluid under pressure for the operation of the resetting mechanism. In order to prevent excessive pressures and their consequences, it is an advantage to provide between the pressure and fluid supply container a conduit containing a relief valve. According to the invention, the control of the operating medium occurs preferably through valves which are operated by a valve connected with the sprung parts, and in such a manner that one valve provides a connection between the pressure chamber and the resetting mechanism and the other valve the connection with the fluid supply container. In accordance with the invention, the control part is shown formed as a double working piston, the pressure spaces of which are filled with a pressure medium and are connected together through a throttling passage, whereby air may be used as the pressure medium or as the operating medium of the resetting mechanism. Furthermore, in accordance with the invention, it is advantageous to resiliently couple the control member with the sprung part; and through the selection of the degree of resilience and the dimensioning of the throttling passage connecting the pressure chambers of the control parts, it becomes possible to delay the initiation of the effectiveness of the resetting means relative to the shocks within wide limits. A construction which is especially easy to apply can be formed when the resetting means, shock absorber, control part, pressure and fluid supply containers are located in a single plane and the auxiliary spring is assembled therewith into a single block; such forms of construction permit of simple application to the vehicle which can be easily accomplished in a short time through clamping the same to the frame of the vehicle and connecting it with a sprung part thereof, as, for example, the rear axle.

Further objects and advantages of this invention will be apparent from consideration of the specification as illustrated by the accompanying drawings of possible embodiments of the invention, in which drawings:

Fig. 1 shows a vertical section through the axis of the resetting means, shock absorber and control parts;

Fig. 2 represents a cut at right angles thereto in accordance with the line II—II of Fig. 1;

Fig. 3 is also a perpendicular view according to line III—III of Fig. 1;

Fig. 4 shows a plan view in section along the line IV—IV of Fig. 1;

Fig. 5 shows a schematic representation of the arrangement and spring means in accordance with the invention; and Fig. 6 shows the characteristic curves of the auxiliary construction and springing.

In said figures, the numeral 1 (Fig. 5) shows the wheel axle which is sprung relative to the frame by any suitable main springing means (not shown). Thereto is attached an arm 2 which operates upon the lever 4 through link 3 (see also Fig. 4). The lever 4 is journaled at 5 and is coupled with the resetting arm 6 which is connected to the auxiliary springs 7, 7'. In the schematic representation of Fig. 5 these springs are indicated as two part helical springs, whereas in the form of construction shown in Figs. 1–4 they are shown as two part serially connected torsion springs 7, 7'. The auxiliary springs 7, 7', react against the resetting piston 8 of the resetting mechanism, the cylinder space 9 whereof is connected on the one hand through the conduit 10, valve 12 and conduit 14 with the pressure container 16, and on the other hand by means of the conduit 11, valve 13 and conduit 15 with the fluid supply container 17. The valves are according to the schematic representation of Fig. 5 simple slides, but in the examples shown in the other figures they are formed as poppet valves. They are actuated by the control member 18 which is formed as a double acting hollow piston; the member 18 is resiliently controlled by the connection 19 by means of the crosshead 20 and springs 21, 21'. The connection 20 is firmly connected to the piston 22 of the shock absorber. The operation of the shock absorber piston occurs through the shock absorber lever 23 connected with the lever 4. The shock absorber pump spaces 24, 25 communicate on the one hand with the pressure container 16 by means of the conduits 26, 27 which are provided with adjustable throttles 28, 29, whereas, they are on the other hand connected with the fluid supply container 17 by means of the check valves 30, 31 and the conduits 32, 33. The pressure spaces 34, 35 of the controlling part 18 are connected together by means of the conduit 36 within which an adjustable throttle 37 is provided. The pressure container 16 and the fluid supply container 17 are connected by means of a conduit 38 in which a relief valve 39 is provided.

In Figs. 1–4 the housing is indicated by the numeral 40, which has eyes 41 for attachment to the frame and is closed by means of a lid 42. The tube 43 which surrounds the torsion bars 7, 7' is firmly connected to the housing 40 and is closed by means of a lid 44. The pressure container 16 is located in the lower part of the housing, whereas the fluid supply container 17 is located in the upper part thereof.

*Operation.*—Upon the occurrence of shocks, the lever 4 is shifted clockwise for example, as indicated by the full line arrow in Fig. 1. Thereby, the swinging lever 23 is also moved, sliding the shock absorber piston 22 to the left. The fluid in the left pump space 24 is thereby placed under pressure and flows to the pressure container 16 through the conduit 26 and the throttle 28; upon the right side 25 of the pump, suction will occur which, on account of the throttle 29, cannot be satisfied sufficiently quickly through conduit 27, so that the check valve 31 is opened, and fluid flows from the fluid supply container 17. Upon the return of the lever 4, i. e., in the direction of the dotted arrow, the shock absorber piston 22 is moved therewith. Both sides of the piston now operate in reverse; that is, fluid is pressed from the right side into the pressure container 16 so that this is rapidly placed under pressure or is continuously held under pressure by the shock absorber. Dangerously high pressures are prevented by the relief valve 39. Since the control member 18 is resiliently moved by the connecting member 19 and since the throttle 37 is located in the conduit 36 which connects the pressure spaces 34, 35 thereof, short, quick shocks cannot effect an opening of valves 12, 13. Through readjustment of the throttle 37 it is possible to alter within wide limits the effectiveness of the resetting device. If now, however, an alteration in the continuous loading of the springing takes place, which is assumed is also in the direction of the full line arrow of Fig. 1, the shock absorber again works as a pump. The control part 18 follows it, delayed more or less, however, depending upon the adjustment of the throttle 37. The valve 12 is opened, whereby fluid flows from the fluid container 16 through the conduits 14 and 10 to the cylinder space 9, lifts the piston 8, and thus places the auxiliary springs 7, 7' under greater stress. Thereby the resetting lever 6 is turned about the point 5 in a counterclockwise direction until the shock absorber piston 22 and thereby also the control member 18 has again returned to its middle position and has again closed the valve 12. By properly selecting the dimensions of springs 21, 21' and regulating the throttle 37, it is thus possible to achieve resetting to the middle position or to a point fluctuating around the middle position. If, however, a continuous light loading occurs, as in the direction of the dotted arrow, the lever 4 first moves counterclockwise, the shock absorber piston 22 carries the control part 18 with it to the right whereby the valve 13 is opened. Fluid flows from the cylinder space 9 to the fluid supply container 17 so that the resetting piston may drop and thereby reduce the initial stressing of springs 7, 7'. This continues until the lever 4, and therewith also the control piston 18, has arrived at a middle piston whereupon the valve 13 is again closed.

The effect of the auxiliary arrangement and springing upon an existent springing is evident from the curves of Fig. 6. If the characteristic curve of the main spring alone is $P=\phi(f)$, a straight line passing through the zero point, the resulting curve with a loading $P_1$ and the middle position $f_1$ is a curve $P=\psi(f)$ through the point $f_1, P_1$ whose subtangents $f'_{10}$ at the point $f_3, P_2$ are the same. Upon the occurrence of continuous loading $P_2$, a new curve $P=\chi(f)$ occurs, which, on account of the resetting operation, passes through the point $f_2, P_2 = f_1, P_2$. The subtangent $f'_{20}$ for this point and the subtangent $f'_{23}$ for the point $f_3, P_3$, arising from a sudden shock, are not only the same but also the subtangents $f'_{10} = f'_{12}$ occur with the loading $P_1$, so that also $f'_{10} = f'_{12} = f'_{20} = f'_{23}$, which indicates that the springing is progressive and that for all loadings and all shocks equal oscillation time is used.

The invention is not only utilizable as an auxiliary springing arrangement but also as a main springing and indeed for all purposes in which a resetting of the sprung part is desirable.

In accordance with the invention, it is unimportant how the individual parts are constructed, which type of spring is selected as auxiliary spring, whether leaf springs or torsion springs, whether solid or hollow, of steel or rubber, or suitably pre-stressed rubber; it is also unimportant whether the auxiliary spring is built in with the arrangement or whether it is spaced therefrom and also how it is coupled with the sprung parts. Furthermore, the relative location of the individual parts is unimportant; thus, for example, the pressure and refilling container may be separated from the other mechanism and one pressure container or refilling container may be utilized for a plurality of such devices. Furthermore, forms of construction are contemplated in which the fluid is a gas such as air, in which event the fluid supply container is no longer necessary.

The invention is not intended to be limited to the forms shown, which are to be understood as illustrative only and not as limiting, as various changes in construction and arrangement may be made, all coming within the scope of the claims which follow.

I claim:

1. In a vehicle including a road wheel and attached unsprung parts, spring means connected therewith and sprung parts supported by said spring means, the combination therewith of an auxiliary device comprising an auxiliary spring assisting said spring means connected between said sprung and unsprung means, an abutment device for said auxiliary spring means, and means controlled by the unsprung parts for automatically readjusting said abutment means to a position whereby said spring means is effective in either direction irrespective of the loading of the vehicle.

2. The combination in accordance with claim 1, wherein the auxiliary spring means is so constructed and arranged as to operate progressively upon the sprung parts.

3. The combination in accordance with claim 1, wherein the auxiliary spring means itself has a progressive action.

4. The combination in accordance with claim 1, wherein the auxiliary spring means is connected to the unsprung parts by means of a lever so constructed and arranged that the effective lever arm is shortened as the action of the auxiliary spring means is increased, whereby progressive springing is effected.

5. Means in accordance with claim 1, wherein the abutment for the auxiliary spring means comprises a fluid operated member.

6. Means in accordance with claim 1, wherein the abutment for the auxiliary spring means comprises a fluid operated member, and in which a pump means is provided operated by the movement of the sprung parts relative to the unsprung parts for supplying fluid under pressure for operating said fluid operated means.

7. Means in accordance with claim 1, wherein the abutment for the auxiliary spring means comprises a fluid operated member and in which a shock absorber mechanism is provided, which shock absorber mechanism serves to place under pressure fluid for operating said abutment means.

8. Means in accordance with claim 1, wherein the abutment for the auxiliary spring means comprises a fluid operated member, and in which a shock absorber mechanism is provided, which shock absorber mechanism serves to place under pressure fluid for operating said abutment means, and in which the pump spaces of said shock absorber are connected with a pressure container through a throttling means and also connected with a fluid supply container through check valves.

9. Means in accordance with claim 1, wherein the abutment for the auxiliary spring means comprises a fluid operated member, and in which a source of fluid pressure therefore is provided, and valve means operated by relative movement between the spring parts and the unsprung parts for controlling the supply of fluid to said fluid operated abutment member.

10. Means in accordance with claim 1, wherein the abutment for the auxiliary spring means comprises a fluid operated member, and in which a source of fluid pressure therefore is provided, valve means operated by relative movement between the spring parts and the unsprung parts for controlling the supply of fluid to said fluid operated abutment member, and means for delaying the action of said valve means so that movements of short duration are ineffective to readjust said abutment.

11. Means in accordance with claim 1, wherein the abutment for the auxiliary spring means comprises a fluid operated member, and in which a source of fluid pressure therefore is provided, and valve means operated by relative movement between the sprung parts and the unsprung parts for controlling the supply of fluid to said fluid operated abutment member, and in which said valve means comprises a double acting piston operated through resilient means.

12. In a vehicle of the class having a road wheel, attached unsprung parts, a main spring connected therewith, and sprung parts supported by said main spring in a position determined by the normal vehicle load, the combination of an auxiliary device comprising an auxiliary spring connected between said sprung and unsprung means, an abutment device for said auxiliary spring means, and means responsive to an increase of the load on the vehicle for automatically readjusting said abutment means to a position whereby said auxiliary spring means is effective to restore said sprung parts to their normal position.

13. Means in accordance with claim 12, wherein the auxiliary spring means is so constructed and arranged as to operate progressively upon the sprung parts.

14. The combination in accordance with claim 12, wherein the auxiliary spring means is connected to the unsprung parts by means of a lever so constructed and arranged that the effective lever arm is shortened as the action of the auxiliary spring means is increased, whereby progressive springing is effected.

15. Means in accordance with claim 12, wherein the abutment for the auxiliary spring means comprises a fluid operated member and in which a pump means is provided operated by the movement of the sprung parts relative to the unsprung parts for supplying fluid under pressure for operating said fluid operated means.

16. Means in accordance with claim 12, wherein the abutment for the auxiliary spring means comprises a fluid operated member, and in which a shock absorber mechanism is provided, which shock absorber mechanism serves to place under pressure fluid for operating said abutment means.

17. Means in accordance with claim 1 wherein the abutment for the auxiliary spring means comprises a fluid operated member, and in which a shock absorber mechanism is provided, which shock absorber mechanism serves to place under pressure fluid for operating said abutment means, said auxiliary spring means, the abutment means therefor and said shock absorber being all combined in a single unitary structure for attachment as a unit to the vehicle.

18. In combination, a spring, an adjustable abutment means for said spring, a source of fluid under pressure, conduits leading from said source to said abutment, and means responsive to the tension of said spring for controlling the flow of fluid through said conduits.

19. In combination, a spring, a fluid-tight chamber, a piston mounted for movement in said chamber and forming an abutment for said spring, a source of fluid under pressure, a sump, a pair of conduits respectively connecting said chamber to said source of fluid and to said sump, valves in said conduits for controlling the flow of fluid therethrough, and means responsive to the tension of said spring for actuating said valves.

20. The combination according to claim 19, in which said last means includes a member movable to actuate said valves upon a continued change in spring tension, but ineffective to actuate said valves when said change in tension is of relatively short duration.

21. In a vehicle having a frame, a road wheel, spring means mounted on said frame, means for actuating said spring means upon up and down movement of said road wheel, a fluid-tight chamber mounted on said frame, a piston forming the abutment for said spring and mounted for movement in said chamber, a source of fluid under pressure, a conduit conecting said source of fluid to said chamber, a valve in said conduit for controlling the flow of fluid through said conduit, and means responsive to the tension of said spring for actuating said valve.

22. The combination according to claim 21, in combination with a second chamber, a second piston mounted for reciprocatory movement in said second chamber, means for positively connecting said second piston for movement upon up and down motion of said wheels, whereby said second chamber and piston form a shock absorber for said road wheel, and conduits connecting said second chamber to said source of fluid, to aid in maintaining the latter under pressure.

23. A unitary detachable spring unit for vehicles comprising, in combination, a casing formed with four independent fluid-tight chambers, rotary spring means journaled in said casing, a piston mounted for reciprocal movement in one of said chambers, a lever arm attached at one end to one end of said rotary spring means and at its other end abutting against said piston, a pair of conduits respectively connecting said first chamber with the second and third chambers, a valve in each of said conduits, a second piston mounted for reciprocatory movement in said fourth chamber for actuation of said valve, and a second lever arm connected at one end for rotation with the other end of said rotary spring means and at its other end for movement of said second piston.

24. The combination according to claim 23, in combination with a third piston mounted for movement within said second piston and directly connected to said second lever arm, and spring means intermediate the outer end of said third piston and the inner end of said second piston.

25. The combination according to claim 23, in which said casing is formed with a fifth chamber, a fourth piston mounted for reciprocatory movement in said fifth chamber and operatively connected with said second lever arm, and conduits connecting the opposite ends of said fifth chamber with said second chamber.

KARL RABE.